US008462375B2

(12) United States Patent
Murata

(10) Patent No.: US 8,462,375 B2
(45) Date of Patent: Jun. 11, 2013

(54) IMAGE FORMING APPARATUS, RECORDING MEDIUM, AND IMAGE FORMING METHOD

(75) Inventor: Takurou Murata, Osaka (JP)

(73) Assignee: KYOCERA Document Solutions Inc. (JP)

( * ) Notice: Subject to any disclaimer, the term of this patent is extended or adjusted under 35 U.S.C. 154(b) by 890 days.

(21) Appl. No.: 12/536,634

(22) Filed: Aug. 6, 2009

(65) Prior Publication Data

US 2010/0118331 A1 May 13, 2010

(30) Foreign Application Priority Data

Nov. 11, 2008 (JP) ................................. 2008-288750

(51) Int. Cl.
*G06F 3/12* (2006.01)
*G06F 3/00* (2006.01)
*G06K 15/00* (2006.01)
*G06K 15/02* (2006.01)
*H04N 1/00* (2006.01)

(52) U.S. Cl.
USPC ....... 358/1.15; 358/1.13; 358/1.14; 358/1.16; 358/401; 358/501; 399/37; 399/70; 399/88

(58) Field of Classification Search
None
See application file for complete search history.

(56) References Cited

U.S. PATENT DOCUMENTS 5,587,799 A * 12/1996 Kawamura et al. ........... 358/296
5,636,332 A * 6/1997 Hibino ......................... 358/1.13
6,134,401 A * 10/2000 Yun et al. ........................ 399/70
6,385,412 B1 * 5/2002 Sadakuni ........................ 399/75
6,393,584 B1 * 5/2002 McLaren et al. ................ 714/14
6,992,928 B2 * 1/2006 Inoue ....................... 365/185.08
7,869,065 B2 * 1/2011 Sugimoto et al. ............ 358/1.13
8,107,105 B2 * 1/2012 Sakai ........................... 358/1.14
2004/0151513 A1 * 8/2004 Nomura ............................ 399/8
2004/0151516 A1 * 8/2004 Takahashi et al. .............. 399/70
2007/0053214 A1 * 3/2007 Coorens .......................... 363/49
2007/0097424 A1 * 5/2007 Mizuno ........................ 358/1.15
2007/0201092 A1 * 8/2007 Okutsu et al. ................ 358/1.16
2007/0206211 A1 * 9/2007 Okutsu et al. ................ 358/1.14
2008/0056751 A1 * 3/2008 Murata ........................... 399/70

FOREIGN PATENT DOCUMENTS

JP 06289948 A * 10/1994
JP 2001-113762 * 4/2001
JP 2004-078043 3/2004
JP 2004-230605 8/2004
JP 2007-243547 * 9/2007
JP 2007243547 9/2007
JP 2009015770 A * 1/2009

* cited by examiner

*Primary Examiner* — King Poon
*Assistant Examiner* — Beniyam Menberu
(74) *Attorney, Agent, or Firm* — McDonnell Boehnen Hulbert & Berghoff LLP

(57) ABSTRACT

When electric power supply is started in response to a power switch being turned on, a control unit determines whether a stored operation mode is a normal mode or a power saving mode with reference to the stored operation mode. More specifically, the control unit determines whether a digital multifunction peripheral is set to operate in the normal mode or the power saving mode before electric power supply to the digital multifunction peripheral is stopped. If the set operation mode is the normal mode, the control unit controls the digital multifunction peripheral to operate in the normal mode. If the set operation mode is the power saving mode, the control unit controls the digital multifunction peripheral to operate in the power saving mode.

12 Claims, 5 Drawing Sheets

IMAGE FORMING APPARATUS, RECORDING MEDIUM, AND IMAGE FORMING METHOD

INCORPORATION BY REFERENCE

This application is based upon and claims the benefit of priority from the corresponding Japanese Patent Application No. 2008-288750 filed Nov. 11, 2008, the entire contents of which are incorporated herein by reference.

BACKGROUND OF THE INVENTION

1. Field of the Invention

The present invention relates generally to an image forming apparatus, a recording medium, and an image forming method. More particularly, the present invention relates to an image forming apparatus having a power saving function, a recording medium, and an image forming method.

2. Description of the Related Art

Conventionally, an image forming apparatus has a normal mode and a power saving mode to reduce power consumption.

In the normal mode, for example, since the temperature of a fixing roller is kept at a level suitable for fixing a developer, such as a toner, the image forming apparatus can immediately perform image formation upon receiving an image formation request. In this case, the power consumption is high.

In the power saving mode, for example, since the temperature of the fixing roller is kept at a level that is higher than room temperature but lower than the temperature employed in the normal mode, the image forming apparatus may be unable to immediately perform image formation upon receiving an image formation request and may require some time for heating the fixing roller to the suitable temperature. In this case, the power consumption is lower than that of the normal mode.

When a standby state continues for a predetermined time period in the normal mode without receiving an image formation request, the image forming apparatus shifts into the power saving mode from the normal mode to reduce the power consumption. Additionally, in response to receiving an image formation request in the power saving mode, the image forming apparatus shifts into the normal mode from the power saving mode and heats the fixing roller to the suitable temperature before forming an image corresponding to the image formation request.

Typically, a conventional image forming apparatus would prompt a user to set an operation mode (i.e. normal mode or power saving mode) immediately after power-on. In this manner, the image forming apparatus is started in the set mode.

Another generally known function for a conventional image forming apparatus is to count the number of times it has performed image formation without shifting into the power saving mode after power-on and the number of times it has shifted into the power saving mode without performing image formation after power-on. If the number of times the image forming apparatus has shifted into the power saving mode without performing image formation is larger than the number of times the image forming apparatus has performed image formation without shifting into the power saving mode, the image forming apparatus is started in the power saving mode instead of the set mode.

Conventionally, a user sets an operation mode for an image forming apparatus by using an operation display unit while in the normal mode. The operation display unit displays screens, such as a screen that allows a user to set the operation mode.

However, users have difficulty in familiarizing themselves with recent image forming apparatuses, which have become more multifunctional in recent years.

Furthermore, because the operation display unit has multiple layers, it may be troublesome for users to change the operation mode for startup. Thus, it has become even more complicated to operate the operation mode.

This tendency particularly manifests itself for users who are not used to operations of image forming apparatuses.

Also, there is a method (described below) for setting the set mode during start-up based on frequency of use in the normal mode versus the power saving mode. The number of times that the image is formed without shifting the mode into the power saving mode, and the number of times that the power saving mode is operated without forming the image after power-on, are stored in a storage device. A complex control system such as a storage space, a circuit, and a program are further required for this method. However, in this example, even when a user wants to operate the image forming apparatus in the normal mode to immediately perform image formation, starting in the power saving mode may prevent the image forming apparatus from immediately performing image formation.

The present invention can configure the startup operation through a simple method that begins after a power switch initiates a power-off operation. Therefore, one aspect of the present invention is capable of switching the operation mode without a complicated control circuit, a program, and a device.

Moreover, the present image forming apparatus is capable of further reducing power consumption, since it can immediately shift to the power saving mode without shifting into the normal mode after power-on.

SUMMARY OF THE INVENTION

According to an aspect of the present invention, an image forming apparatus includes a power supply starting unit configured to start supplying electric power to the image forming apparatus and a power supply stopping unit configured to stop supplying the electric power to the image forming apparatus. A setting unit is configured to set, before the power supply stopping unit stops supplying the electric power to the image forming apparatus, the image forming apparatus to operate in a first mode or a second mode. The first mode is an operation mode in which the image forming apparatus operates with predetermined power consumption, while the second mode is an operation mode in which the image forming apparatus operates with power consumption that is lower than the predetermined power consumption. A storage unit is configured to store the operation mode set by the setting unit. A control unit is configured to control the image forming apparatus to operate in the operation mode stored in the storage unit when the power supply starting unit starts supplying the electric power to the image forming apparatus.

Another aspect of the present invention provides a computer-readable storage medium storing a program for causing an image forming apparatus to operate in a mode according to a user's request with a simple method at the time of starting of power supply.

According to yet another aspect of the present invention, a computer-readable storage medium storing a program includes computer-executable instructions. These include computer-executable instructions for causing a power supply starting unit to start supplying electric power to an image forming apparatus and computer-executable instructions for causing a power supply stopping unit to stop supplying the electric power to the image forming apparatus. Computer-executable instructions cause a setting unit to set, before the power supply stopping unit stops supplying the electric power to the image forming apparatus, the image forming apparatus to operate in a first mode or a second mode. The first mode is an operation mode in which the image forming apparatus operates with predetermined power consumption, while the second mode is an operation mode in which the image forming apparatus operates with power consumption that is lower than the predetermined power consumption. Computer-executable instructions cause a storage unit to store the operation mode set by the setting unit. Finally, computer-executable instructions cause a control unit to control the image forming apparatus to operate in the operation mode stored in the storage unit when the power supply starting unit starts supplying the electric power to the image forming apparatus.

Still another aspect of the present invention provides an image forming method for causing an image forming apparatus to operate in a mode according to a user's request with a simple method at the time of starting of power supply.

According to another aspect of the present invention, an image forming method includes a power supply starting step of starting to supply electric power to an image forming apparatus and a power supply stopping step of stopping the supply of electric power to the image forming apparatus. A setting step includesf setting, before the electric power supply to the image forming apparatus is stopped at the power supply stopping step, the image forming apparatus to operate in a first mode or a second mode. The first mode is an operation mode in which the image forming apparatus operates with predetermined power consumption, while the second mode is an operation mode in which the image forming apparatus operates with power consumption that is lower than the predetermined power consumption. A storage step includes storing the operation mode set at the setting step. A control step includes controlling the image forming apparatus to operate in the operation mode stored at the storage step when the electric power supply to the image forming apparatus is started at the power supply starting step.

Further features and advantages of the present invention will become apparent from the description of embodiments given below.

DESCRIPTION OF THE PREFERRED EMBODIMENTS

A configuration of a unit according to an embodiment of the present invention for solving the above-described problem will be described below with reference to the accompanying drawings.

Figure 1:
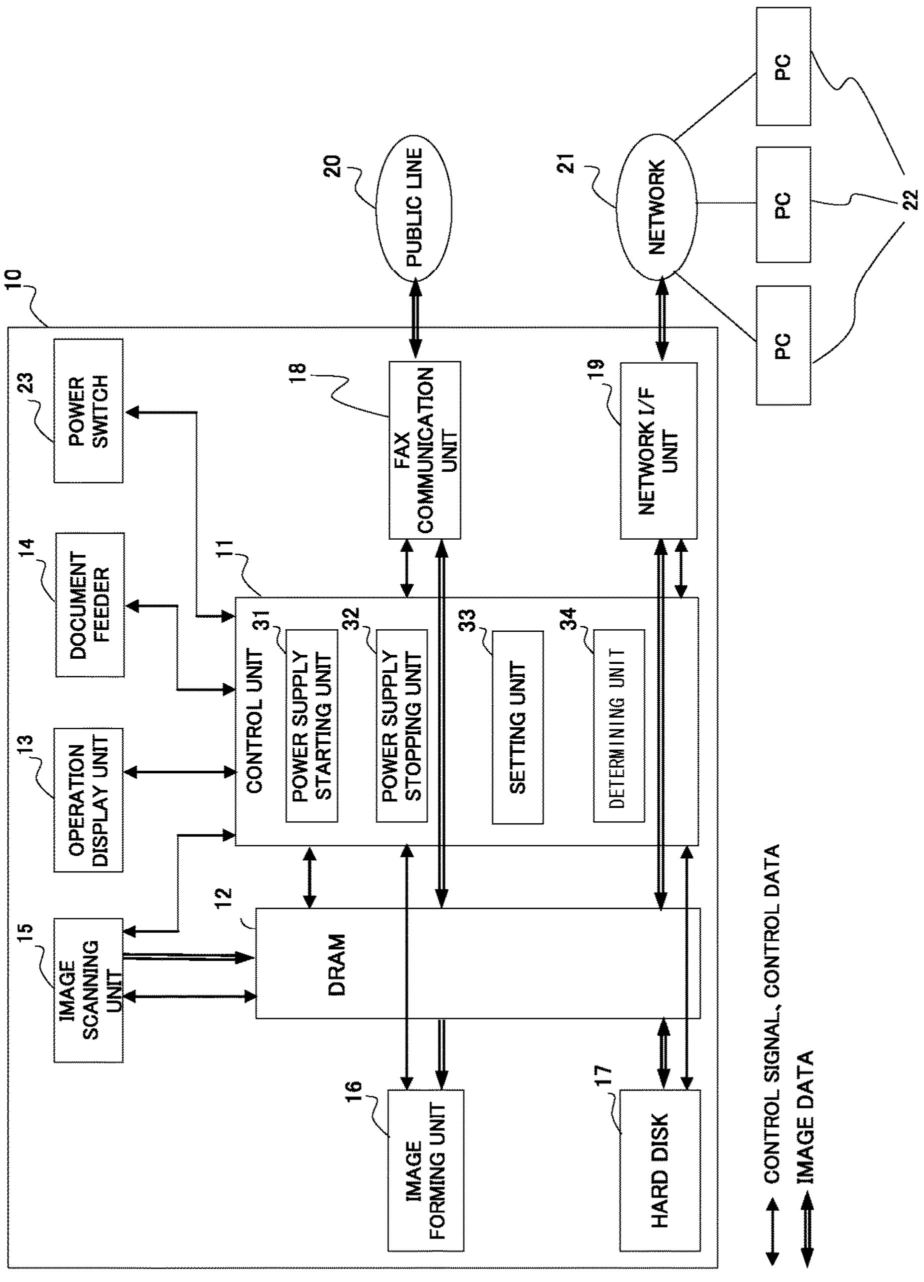
FIG. 1 is a block diagram showing a configuration of a digital multifunction peripheral (MFP) to which an image forming apparatus according to an embodiment of the present invention is applied.

FIG. 1 is a block diagram showing a configuration of a digital multifunction peripheral (MFP) 10 to which an image forming apparatus according to an embodiment of the present invention is applied. Referring to FIG. 1, the digital MFP 10 includes a control unit 11, a dynamic random access memory (DRAM) 12, an operation display unit 13, a document feeder 14, an image scanning unit 15, an image forming unit 16, a hard disk 17, a facsimile (FAX) communication unit 18, a network interface (I/F) unit 19, and a power switch 23.

Moreover, the control unit 11 includes power supply starting unit 31, power supply stopping unit 32, setting unit 33, and determining unit 34.

In addition, the hard disk 17 includes a storage unit configured to store the operation mode set by a setting unit 33.

The control unit 11 controls the digital MFP 10. Image data or the like is written in or read out from the DRAM 12. The operation display unit 13 includes a display screen for displaying information belonging to the digital MFP 10 and serves as an interface between the digital MFP 10 and a user. The document feeder 14 automatically conveys a document to a predetermined document scanning position. The image scanning unit 15 scans an image of a document fed by the document feeder 14 at the predetermined scanning position with a scanner. The image forming unit 16 forms an image based on a document scanned by the image scanning unit 15. The hard disk 17 stores image data or the like. The FAX communication unit 18 is connected to a public line 20. The network I/F unit 19 is connected to a network 21. The power switch 23 serves as a power supply starting unit 31 that starts supplying electric power to the digital MFP 10 in response to power-on and a power supply stopping unit 32 that stops supplying electric power to the digital MFP 10 in response to power-off.

The control unit 11 writes document data supplied from the image scanning unit 15 in the DRAM 12 after performing compression and encoding. The control unit 11 also reads out data written in the DRAM 12 and outputs the read out data to the image forming unit 16 after performing decompression and decoding.

The digital MFP 10 functions as a copier by forming an image with the image forming unit 16 through the DRAM 12 using data of a document scanned by the image scanning unit 15. The digital MFP 10 also functions as a printer by forming an image with the image forming unit 16 through the DRAM 12 using image data transmitted from a personal computer (PC) 22 connected to the network 21 through the network I/F unit 19. Furthermore, the digital MFP 10 functions as a facsimile machine by forming an image with the image forming unit 16 through the DRAM 12 using image data transmitted from the public line 20 through the FAX communication unit 18 and by transmitting image data of a document scanned by the image scanning unit 15 to the public line 20 through the FAX communication unit 18. Accordingly, the digital MFP 10 has a plurality of image processing functions, such as a copier function, a printer function, and a FAX function. The digital MFP 10 also has functions for making detailed settings for each of the image processing functions.

In FIG. 1, a thick arrow represents a flow of image data, whereas a thin arrow represents a flow of a control signal or control data.

The digital MFP 10 has a normal mode (a first mode) and a power saving mode (a second mode).

For example, in the normal mode, since the temperature of a fixing roller (not shown) provided in the image forming unit 16 is kept at a level suitable for fixing a developer, such as a toner, the digital MFP 10 can immediately perform image formation in response to receiving an image formation request. Although the fixing roller is mentioned here because it often has the highest power consumption, other functions of the image scanning unit 15 and the image forming unit 16 that have high power consumption are also maintained in appropriate states. Accordingly, the normal mode is a mode allowing the digital MFP 10 to perform image formation within a predetermined time period upon receiving an image formation request. In this case, the digital MFP 10 operates with predetermined power consumption.

In the power saving mode, for example, the temperature of the fixing roller is kept at a level that is higher than the temperature of a place where the digital MFP 10 is installed but is lower than the level employed in the normal mode. Accordingly, the digital MFP 10 may be unable to immediately perform image formation in response to receiving an image formation request. It may require time to prepare functions necessary for image formation, such as heating the fixing roller to the suitable temperature. Accordingly, the power saving mode is a mode allowing the digital MFP 10 to perform image formation after a time period that is longer than the above-described predetermined time period in response to receiving an image formation request. In this case, the digital MFP 10 operates with power consumption that is lower than the predetermined power consumption of the normal mode.

When a standby state continues for a predetermined period without receiving an image formation request in the normal mode, the digital MFP 10 shifts into the power saving mode from the normal mode to reduce power consumption. On the other hand, upon receiving an image formation request in the power saving mode, the digital MFP 10 shifts into the normal mode from the power saving mode, heats the fixing roller to the suitable temperature, and performs image formation corresponding to the image formation request.

Figure 2:
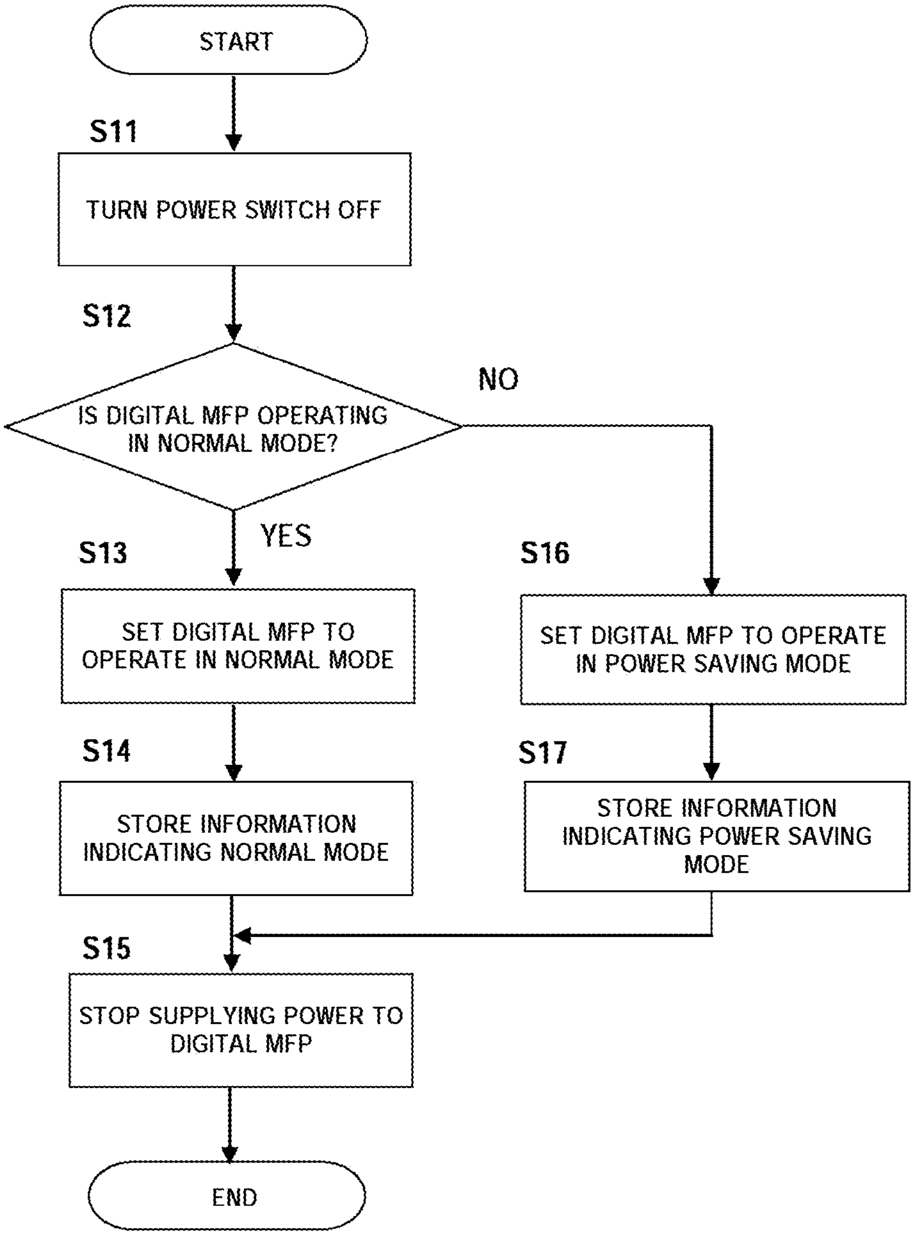
FIG. 2 is a flowchart showing processing for stopping electric power supply to a digital MFP to which an image forming apparatus according to an embodiment of the present invention is applied.

FIG. 2 is a flowchart showing processing for stopping electric power supply to the digital MFP 10 of FIG. 1. A case of stopping electric power supply to the digital MFP 10 will be described with reference to FIGS. 1 and 2.

First, the control unit 11 detects that the power switch 23 has been turned off (STEP S11 of FIG. 2, hereinafter STEP is omitted).

The control unit 11 then determines whether the digital MFP 10 is operating in the normal mode or the power saving mode (S12). At this time, the control unit 11 functions as a determining unit 34. In this embodiment, it is assumed that the control unit 11 determines that the digital MFP 10 is operating in the normal mode (YES at S12).

The control unit 11 then sets the digital MFP 10 to operate in the normal mode at the time of restart (S13). More specifically, the control unit 11 sets the digital MFP 10 to operate in the determined operation mode. At this time, the control unit 11 functions as a setting unit 33. The control unit 11 then stores information indicating the normal mode (S14). More specifically, the control unit 11 stores information indicating the set operation mode in, for example, the hard disk 17. At this time, the hard disk 17 serves as a storage unit. The control unit 11 then stops supplying electric power to the digital MFP 10 (S15).

If the control unit 12 determines that the digital MFP 10 is operating in the power saving mode at S12 (NO at S12), the control unit 11 sets the digital MFP 10 to operate in the power saving mode at the time of restart (S16) and stores information indicating the power saving mode (S17).

Figure 3:
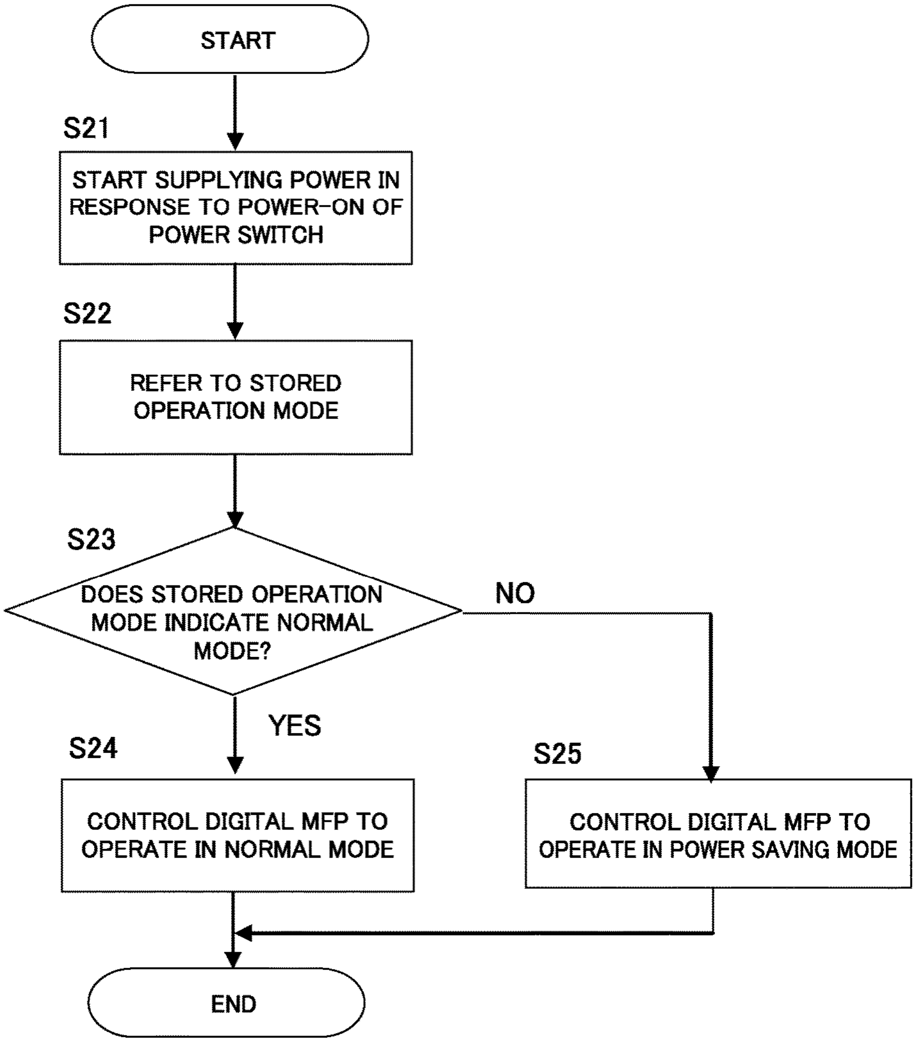
FIG. 3 is a flowchart showing processing for starting electric power supply to a digital MFP to which an image forming apparatus according to an embodiment of the present invention is applied.

A case of starting electric power supply to the digital MFP 10 will now be described. FIG. 3 is a flowchart showing processing for starting electric power supply to the digital MFP 10. Referring to FIGS. 1 to 3, the control unit 11 starts supplying electric power to the digital MFP 10 in response to the power switch 23 being turned off (S21). That is, the control unit 11 starts the digital MFP 10.

The control unit 11 refers to the operation mode stored at S14 of FIG. 2 (S22) and determines whether the stored operation mode is the normal mode or the power saving mode (S23). More specifically, the control unit 11 determines whether the digital MFP 10 was set to operate in the normal mode or the power saving mode when electric power supply to the digital MFP 10 was stopped.

In this embodiment, since the digital MFP 10 is set to operate in the normal mode (YES at S23), the control unit 11 controls the digital MFP 10 to operate in the normal mode (S24). That is, the control unit 11 controls the digital MFP 10 to operate in the stored operation mode. At this time, the control unit 11 functions as a control unit.

As described above, the digital MFP 10 is set to operate in a first mode or a second mode before electric power supply to the digital MFP 10 is stopped. When electric power supply to the digital MFP 10 is started, the digital MFP 10 is controlled to operate in the set operation mode. With such a configuration, a user is no longer required to set an operation mode of the digital MFP 10 employed immediately after starting the supply of electric power. Accordingly, it is possible to easily set the operation mode of the digital MFP 10. Additionally, when electric power supply to the digital MFP 10 is started, it is possible to operate the digital MFP 10 in the set mode. As a result, when electric power supply to the digital MFP is started, it is possible to operate the digital MFP 10 in a mode according to a user's request with a simple method.

Since whether the digital MFP 10 is operating in the normal mode or the power saving mode is determined and the operation mode of the digital MFP 10 is then set in accordance with the determined result, it is easier to set the operation mode of the digital MFP 10.

When it is determined that the stored operation mode is the power saving mode at S23 (NO at S23), the control unit controls the digital MFP 10 to operate in the power saving mode (S25).

As described with reference to FIG. 2, an example has been given for setting the digital MFP 10 to operate in the normal mode when the determined operation mode is the normal mode and setting the digital MFP 10 to operate in the power saving mode when the determined operation mode is the power saving mode in the above-described embodiment. However, the set mode is not limited to this particular example. The control unit 11 may set the digital MFP 10 to operate in the power saving mode when the determined operation mode is the normal mode, whereas the control unit 11 may set the digital MFP 10 to operate in the normal mode when the determined operation mode is the power saving mode.

Also as described with reference to FIG. 2, an example has been given for determining whether the digital MFP 10 is operating in the normal mode or the power saving mode and then setting the operation mode of the digital MFP 10 in accordance with the determined result in the above-described embodiment. However, the setting method is not limited to this particular example. For example, the operation mode of the digital MFP 10 may be set in accordance with the time of day or the day of the week of turn-off of the power switch 23.

Another embodiment of the present invention will now be described.

Before a power supply stopping unit 32 stops supplying electric power to an image forming apparatus, a determining unit 34 determines whether the image forming apparatus is operating in a first mode or a second mode.

Still another embodiment of the present invention will now be described.

A setting unit 33 sets an image forming apparatus to operate in a first mode when an operation mode determined by a determining unit 34 is the first mode. The setting unit sets the image forming apparatus to operate in a second mode when the operation mode determined by the determining unit 34 is the second mode.

A further embodiment of the present invention will be described.

A first mode is a mode allowing image formation to be performed within a predetermined time period in response to receiving an image formation request. A second mode is a mode allowing image formation to be performed after a time period that is longer than the predetermined time period in response to receiving an image formation request.

A still further embodiment of the present invention will be described.

Figure 4:
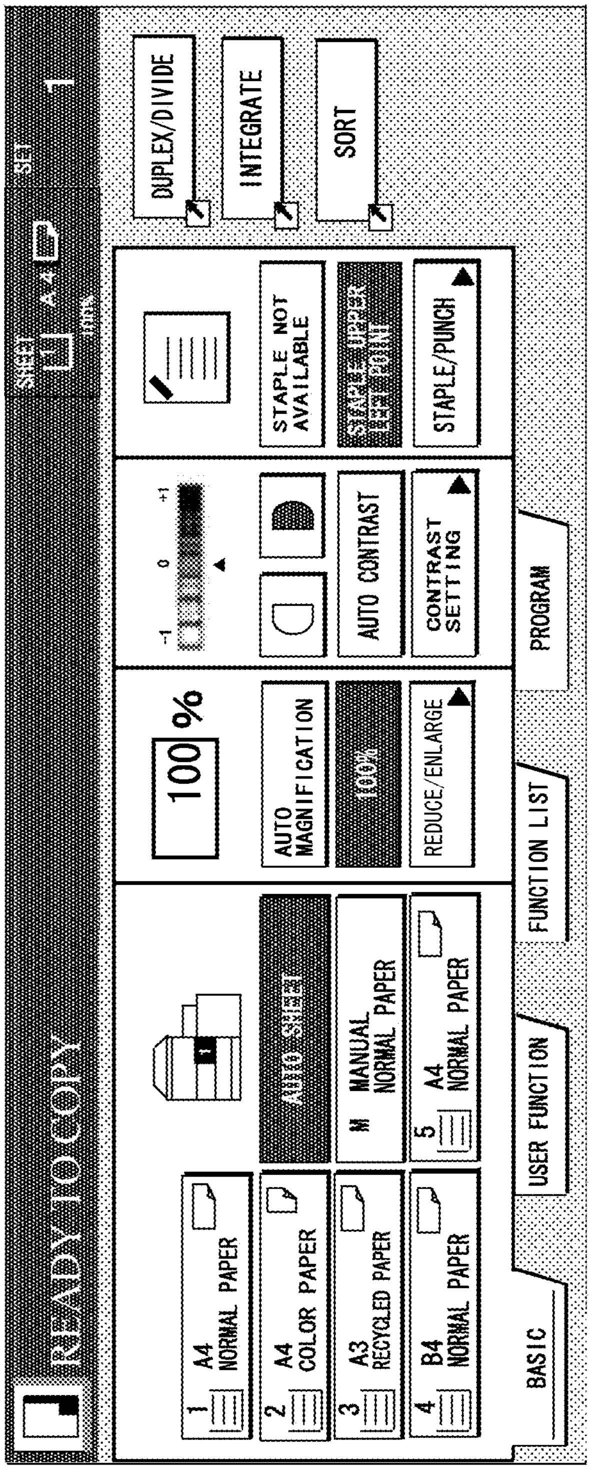
FIG. 4 is a diagram showing an image displayed on an operation display unit in a normal mode when an image forming apparatus according to an embodiment of the present invention is applied to a digital MFP.
Figure 5:
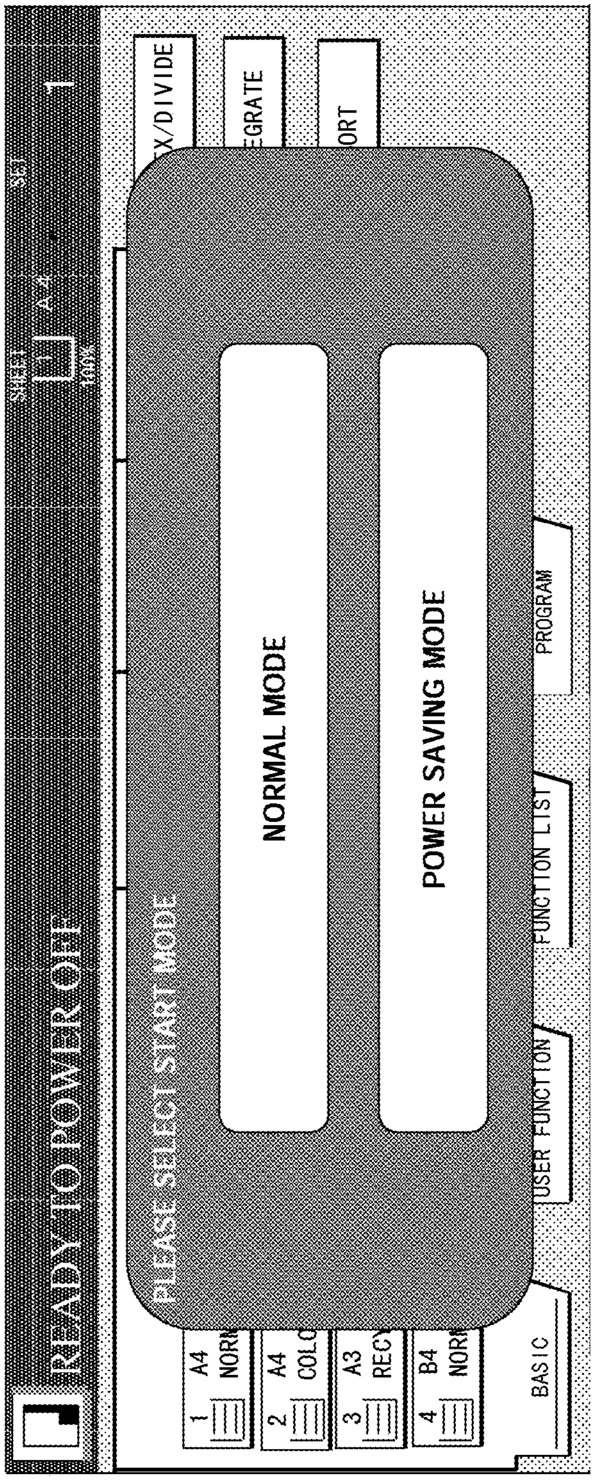
FIG. 5 is a diagram showing an image displayed on an operation display unit at the time of selection of an operation mode according to an embodiment of the present invention.

Before electric power supply to the digital MFP 10 is stopped, an image displayed on the operation display unit 13 may be switched from a normal-mode image like the one shown in FIG. 4 to an image like the one shown in FIG. 5. This prompts a user to select an operation mode, i.e., the normal mode or the power saving mode, employed at the time of start.

In this case, when the controlling unit 11 cannot detect which operating mode has been set (i.e. because the user did not select an operation mode within a certain set elapsed time period from when the operation display unit 13 displayed the image shown in FIG. 5), the controlling unit 11 may be configured to not change the operation mode from its current setting.

Although embodiments of the present invention have been described with reference to the accompanying drawings above, the present invention should not be limited to the above-described embodiments. Various modifications and alterations can be made to the above-described embodiments within the scope of the present invention and the scope of the equivalence thereof.

What is claimed is:

1. An image forming apparatus comprising:

a power supply starting unit configured to start supplying electric power to the image forming apparatus in response to a power switch being turned on;

a power supply stopping unit configured to stop supplying the electric power to the image forming apparatus in response to the power switch being turned off;

a setting unit configured to set, before the power supply stopping unit stops supplying the electric power to the image forming apparatus in response to the power switch being turned off, the image forming apparatus to operate in an operation mode, wherein the operation mode is one of a first mode in which the image forming apparatus operates with predetermined power consumption such that image formation is performed within a predetermined time period in response to receiving an image formation request or a second mode in which the image forming apparatus operates with power consumption that is lower than the predetermined power consumption such that image formation is performed after a time period that is longer than the predetermined time period in response to receiving the image formation request;

a storage unit configured to store the operation mode set by the setting unit;

a control unit configured to control the image forming apparatus to operate in the operation mode stored in the storage unit when the power supply starting unit starts supplying the electric power to the image forming apparatus in response to the power switch being turned on; and an operation display unit configured to provide an interface between the image forming apparatus and a user;

wherein the setting unit displays a selection screen on the operation display unit prompting the user to select the first mode or the second mode of the operation mode employed at startup when the power supply stopping unit starts a power supply stopping procedure in response to the power switch being turned off.

2. The apparatus according to claim 1, further comprising:

a determining unit configured to determine whether the image forming apparatus is operating in the first mode or the second mode before the power supply stopping unit stops supplying the electric power to the image forming apparatus.

3. The apparatus according to claim 2, wherein the setting unit sets the image forming apparatus to operate in the first mode if the operation mode determined by the determining unit is the first mode, and wherein the setting unit sets the image forming apparatus to operate in the second mode if the operation mode determined by the determining unit is the second mode.

4. The apparatus according to claim 1, wherein the control unit may be configured to not change the operation mode from its current setting if the control unit cannot detect that the operation mode has been set within a certain set elapsed time period.

5. A non-transitory computer-readable recording medium storing a program, comprising:

computer-executable instructions for causing a power supply starting unit to start supplying electric power to an image forming apparatus in response to a power switch being turned on;

computer-executable instructions for causing a power supply stopping unit to stop supplying the electric power to the image forming apparatus in response to the power switch being turned off;

computer-executable instructions for causing a setting unit to set, before the power supply stopping unit stops supplying the electric power to the image forming apparatus in response to the power switch being turned off, the image forming apparatus to operate in an operation mode, wherein the operation mode is one of a first mode in which the image forming apparatus operates with predetermined power consumption such that image formation is performed within a predetermined time period in response to receiving an image formation request or a second mode in which the image forming apparatus operates with power consumption that is lower than the predetermined power consumption such that image formation is performed after a time period that is longer than the predetermined time period in response to receiving the image formation request;

computer-executable instructions for causing a storage unit to store the operation mode set by the setting unit;

computer-executable instructions for causing a control unit to control the image forming apparatus to operate in the operation mode stored in the storage unit when the power supply starting unit starts supplying the electric power to the image forming apparatus in response to the power switch being turned on; and computer-executable instructions for causing an operation display unit to provide an interface between the image forming apparatus and a user;

wherein the setting unit displays an image on the operation display unit prompting the user to select the first mode or the second mode of the operation mode employed at startup when the power supply stopping unit starts a power supply stopping procedure in response to the power switch being turned off.

6. The non-transitory computer-readable recording medium according to claim 5, further comprising:

computer-executable instructions for causing a determining unit to determine whether the image forming apparatus is operating in the first mode or the second mode before the power supply stopping unit stops supplying the electric power to the image forming apparatus.

7. The non-transitory computer-readable recording medium according to claim 6, wherein the setting unit sets the image forming apparatus to operate in the first mode if the operation mode determined by the determining unit is the first mode, and wherein the setting unit sets the image forming apparatus to operate in the second mode if the operation mode determined by the determining unit is the second mode.

8. The non-transitory computer-readable recording medium according to claim 5, wherein the computer-executable instructions for causing the control unit to control the image forming apparatus to operate in the operation mode cause the control unit to be configured to not change the operation mode from its current setting if the control unit cannot detect that the operation mode has been set within a certain set elapsed time period.

9. An image forming method comprising:

a power supply starting step of starting supplying electric power to an image forming apparatus in response to a power switch being turned on;

a power supply stopping step of stopping supplying the electric power to the image forming apparatus in response to the power switch being turned off;

a setting step of setting, before the electric power supply to the image forming apparatus is stopped at the power supply stopping step in response to the power switch being turned off, the image forming apparatus to operate in an operation mode, wherein the operation mode is one of a first mode in which the image forming apparatus operates with predetermined power consumption such that image formation is performed within a predetermined time period in response to receiving an image formation request or a second mode in which the image forming apparatus operates with power consumption that is lower than the predetermined power consumption such that image formation is performed after a time period that is longer than the predetermined time period in response to receiving the image formation request;

a storage step of storing the operation mode set at the setting step;

a control step of controlling the image forming apparatus to operate in the operation mode stored at the storage step when the electric power supply to the image forming apparatus is started at the power supply starting step in response to the power switch being turned on; and an operation display step of providing an interface between the image forming apparatus and a user, wherein the setting step includes displaying at the operation display step an image prompting the user to select the first mode or the second mode of the operation mode employed at startup when a power supply stopping procedure is started at the power supply stopping step in response to the power switch being turned off.

10. The method according to claim 9, further comprising: a determining step of determining whether the image forming apparatus is operating in the first mode or the second mode before the electric power supply to the image forming apparatus is stopped at the power supply stopping step.

11. The method according to claim 10, wherein the setting step sets the image forming method to operate in the first mode if the operation mode determined by the determining step is the first mode, and wherein the setting step sets the image forming method to operate in the second mode if the operation mode determined by the determining step is the second mode.

12. The method according to claim 9, wherein the control step includes configuring the control unit to not change the operation mode from its current setting if the control unit cannot detect that the operation mode has been set within a certain set elapsed time period.

* * * * *